(12) United States Patent
Johnston, Jr. et al.

(10) Patent No.: US 9,803,055 B2
(45) Date of Patent: Oct. 31, 2017

(54) METHOD FOR PRODUCING FLUORINATED POLYSILOXANE

(71) Applicant: HEMPEL A/S, Kongens Lyngby (DK)

(72) Inventors: Douglas E. Johnston, Jr., Ft. Worth, TX (US); Roland L. Gasmena, Carrollton, TX (US); Mark Stephen Miller, Dallas, TX (US); Paul Anthony Lum, Irving, TX (US); Jasmine Keuk Lum, Rowlett, TX (US); Ronaldo J. Nicolas, Wylie, TX (US)

(73) Assignee: HEMPEL A/S, Kongens Lyngby (DK)

( * ) Notice: Subject to any disclaimer, the term of this patent is extended or adjusted under 35 U.S.C. 154(b) by 0 days.

(21) Appl. No.: 15/137,464

(22) Filed: Apr. 25, 2016

(65) Prior Publication Data

US 2016/0264736 A1 Sep. 15, 2016

Related U.S. Application Data

(63) Continuation-in-part of application No. 14/629,969, filed on Feb. 24, 2015, now abandoned.

(51) Int. Cl.
*C08G 77/385* (2006.01)
*C08G 77/16* (2006.01)
*C08G 77/18* (2006.01)

(52) U.S. Cl.
CPC .......... *C08G 77/385* (2013.01); *C08G 77/16* (2013.01); *C08G 77/18* (2013.01)

(58) Field of Classification Search
None
See application file for complete search history.

(56) References Cited

U.S. PATENT DOCUMENTS

| | | | |
|---|---|---|---|
| RE29,760 E | 9/1978 | Brown et al. | |
| 4,555,529 A * | 11/1985 | Lee | C08J 9/14 |
| | | | 521/124 |
| 4,778,862 A * | 10/1988 | Woo | C09D 151/085 |
| | | | 525/474 |
| 5,417,744 A | 5/1995 | Gasmena | |
| 5,777,047 A * | 7/1998 | Chung | C08G 77/385 |
| | | | 525/478 |
| 2001/0019773 A1 | 9/2001 | Akamatsu et al. | |
| 2001/0029277 A1 | 10/2001 | Sato et al. | |
| 2004/0146473 A1 | 7/2004 | Lion | |
| 2006/0208228 A1 | 9/2006 | Chiba et al. | |
| 2008/0311378 A1 | 12/2008 | Simpson | |
| 2012/0064022 A1 | 3/2012 | Wray et al. | |
| 2013/0004438 A1 | 1/2013 | Barba et al. | |
| 2013/0150457 A1 | 6/2013 | Feltin et al. | |
| 2014/0112877 A1 | 4/2014 | Niki et al. | |
| 2014/0163073 A1 | 6/2014 | Matsui et al. | |
| 2014/0178317 A1 | 6/2014 | Gaudry et al. | |
| 2014/0196631 A1 | 7/2014 | McDaniel | |

FOREIGN PATENT DOCUMENTS

WO WO 2013/096332 A1 6/2013
WO WO 2013/190709 A1 12/2013

OTHER PUBLICATIONS

Steward et al., "Fluoroalkyl- and 3-(Fluoroalkoxy) propylpolysiloxanes", R. West, J.Am. Chem. Soc., 76, 6012 (1954), pp. 2943-2947, Aug. 1961.

* cited by examiner

*Primary Examiner* — Marc Zimmer

(74) *Attorney, Agent, or Firm* — Birch, Stewart, Kolasch & Birch, LLP

(57) ABSTRACT

This present disclosure relates to fluorinated polysiloxane resin compositions, and method for making the same, without the need for using halogen acids, and that display excellent properties of impact resistance, flexibility, chemical resistance, corrosion resistance, weather resistance, heat and fire resistance, abrasion resistance, ultraviolet resistance, hydrophobicity, and substrate adhesion.

24 Claims, 3 Drawing Sheets

METHOD FOR PRODUCING FLUORINATED POLYSILOXANE

CROSS REFERENCE TO RELATED APPLICATIONS

This application is a Continuation-in-Part of copending U.S. application Ser. No. 14/629,969, filed on Feb. 24, 2015, which is hereby expressly incorporated by reference into the present application.

FIELD

The present disclosure generally relates to a coating and more particular to a fluorinated polysiloxane coating.

BACKGROUND

Fluorinated resin compositions are useful in forming protective coatings because of the excellent physical properties of chemical, corrosion, weather, and ultraviolet resistance that such compositions provide. Fluorinated resin compositions that are prepared using silicon-containing polymers provide enhanced properties of chemical, weathering and UV resistance.

Fluorinated resin compositions are conventionally prepared by reacting a designated polymer with a halogenated acid using a catalyst, thereby forming a fluorinated composition having one or more enhanced properties. However, one disadvantage is that halogenated acids only work with hydrocarbon resins. Thus, it would not be useful for creating a halogenated polysiloxane. Another potential disadvantage is that the resulting halogenated resin is typically non-reactive. This makes it more difficult to further cross-link the halogenated resin, either alone or with one or more additional compounds, to form a cured coating or another product.

Conventional fluorinated resin compositions are useful, for example, as protective coatings on such substrates as metal, glass, and the like to provide an enhanced degree of chemical and weather protection. Such conventional fluorinated resin compositions are typically spray-applied to the substrate, and are first diluted by organic solvent to facilitate the same. The use of organic solvents to dilute or thin chemical compositions has recently come under state and/or federal regulation due to the high volatile organic compound (VOC) content of such solvent-containing compositions and the related release of volatile constituents into the environment. Accordingly, the need exists for fluorinated resin compositions formulated to conform to state and/or federal VOC regulations.

It is, therefore, desired that fluorinated resin compositions be formulated in a manner that avoids the need to use potentially dangerous halogen acids. It is desired that such fluorinated resin compositions so formed display equal or superior properties of chemical, corrosion, weather, heat and fire, and ultraviolet resistance when compared to fluorinated resin compositions prepared using halogen acids. It is desired that such fluorinated resin compositions be adapted for use as a protective coating and the like and conform with existing state and federal VOC regulations. It is further desired that such fluorinated resin compositions be prepared using commercially available ingredients.

SUMMARY

In one embodiment the present disclosure relates to a method of producing a fluorinated polysiloxane including providing at least one silicone resin selected from the group consisting of hydroxyl-functional silicon resins, alkoxy-functional silicone resins and mixtures thereof, adding a fluorinated alcohol to the silicon resin to form a mixture, adding a catalyst to the mixture, and reacting the silicon resin and fluorinated alcohol in the presence of the catalyst to form a fluorinated polysiloxane, wherein the at least one silicon resin comprises an alkoxy functional silicon resin, wherein the at least one silicon resin comprises an alkoxy functional silicon resin having the following structure:

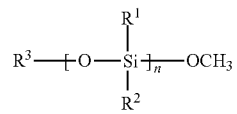

wherein each $R^1$ and $R^2$ are independently selected from the group consisting of a methyl group, a phenyl group, an alkoxide group or an alkyl group, $R^3$ is selected from the group consisting of silicon, a methyl group, a phenyl group or an alkyl group, and n is greater than 1.

In an alternative embodiment, the present disclosure relates to a method of producing a fluorinated polysiloxane including providing at least one silicone resin selected from the group consisting of hydroxyl-functional silicon resins, alkoxy-functional silicone resins and mixtures thereof, adding a fluorinated alcohol to the silicon resin to form a mixture, adding a catalyst to the mixture, and reacting the silicon resin and fluorinated alcohol in the presence of the catalyst to form a fluorinated polysiloxane, wherein the fluorinated polysiloxane retains some hydroxyl or alkoxy functionality, wherein the ratio of fluorinated alcohol to alkoxy or hydroxyl functionality is about 1:1 to about 3:1.

BRIEF DESCRIPTION OF DRAWINGS

For a more complete understanding of the present disclosure and for further advantages thereof, reference is now made to the following description taken in conjunction with the accompanying drawings in which.

DETAILED DESCRIPTION

Figure 1:
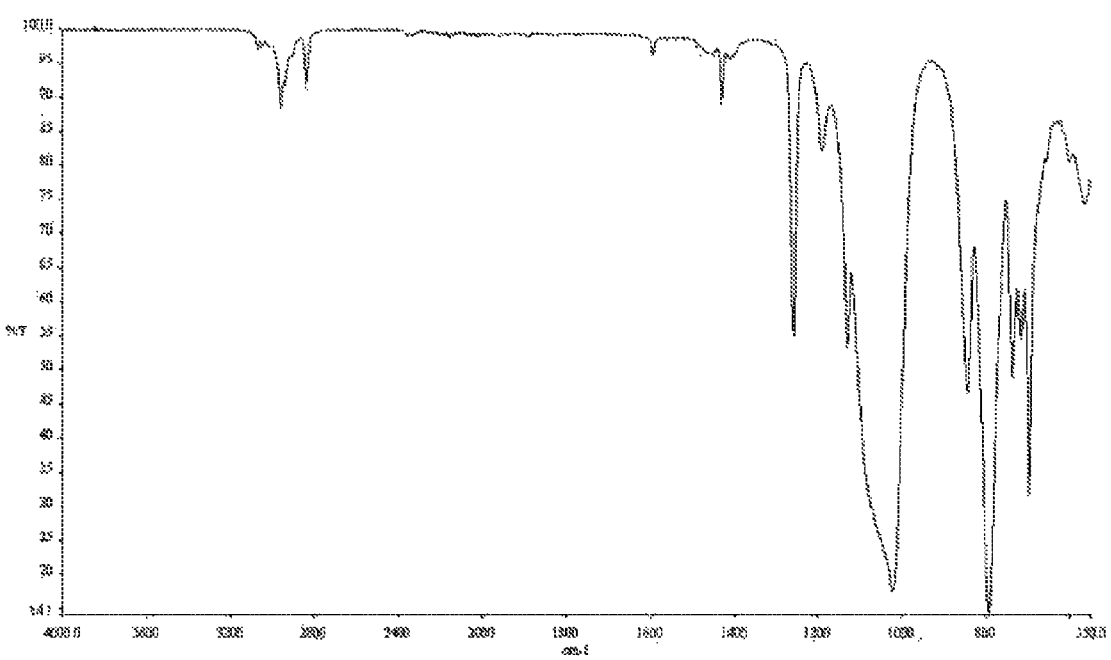
FIG. 1 is a graph of an FTIR (Fourier Transform Infrared) analysis of DC3037 showing the percent transmittance on the ordinate axis and the wavelength in cm$^{-1}$ on the abscissa axis.

The present disclosure can be better understood by the following discussion of the manufacture and use of certain preferred embodiments. All data disclosed below regarding time, temperature, amount of components, concentration in % by weight, etc. are to be interpreted as also including all values lying in the range of the respective measuring accuracy known to the person skilled in the art. Unless otherwise stated, technical grades of the various materials were used in the preferred embodiments. The term "substantially free" is intended to connote that the particular material is not detected (i.e. is below the detection limit) using standard commercial tests and methodologies used in the industry as of the earliest priority date of this application.

The preferred fluorinated polysiloxane resin compositions are prepared by combining i) at least one silicone intermediate selected from the group consisting of hydroxy- and alkoxy-functional silicone resins; 2) an optional silane selected from the group consisting of arylalkoxy silanes, alkylalkoxy silanes, and mixtures thereof; 3) a fluorinated alcohol; and 4) a catalyst, including organometallic compounds, acids, bases, and mixtures thereof. The catalyst is not strictly necessary but is added to facilitate reaction and ambient temperature curing of the resulting composition. The reaction may be carried out in a suitable solvent or mixture of solvents or solvent free.

This preferred process avoids the need for any halogenated acids and results in a fluorinated polysiloxane that is substantially free of any halogenated acids. In addition, the preferred fluorinated polysiloxanes have the benefit that they remain reactive resins. This allows the resulting fluorinated polysiloxanes to further cross-link either by itself or with one or more other compounds in order to provide a wider range of coatings and other products.

The preferred alkoxy functional silicone resin is Xiameter™ RSN-3037, MW 700-1500. Xiameter™ is a registered trademark of and is available from Dow Corning of Midland, Michigan. It is preferred due to its low viscosity (8-20 cSt), 0.25:1 phenyl/methyl group ratio and 15-18% alkoxy functionality. Other preferred alkoxy functional silicone resins include Silres® IC 232 (alkoxy content 0-20%), Silres® IC 368 (alkoxy content 0-20%) and Silres® IC 836 (MW 1200-1500). Silres® is a registered trademark of and available from Wacker Chemie AG of Munich, Germany. Additional preferred alkoxy functional silicone resins that are available from Dow Corning include, RSN0217 (MW 1500-2500), RSN0220 (MW 2000-4000), RSN0233 (MW 2000-4000), RSN0249 (MW 2000-4000), RSN0255 (MW 2500-4500), RSN0409 (MW 2000-7000), RSN0431 (MW 2000-7000) (also known as Dow Corning® 1-2530), RSN0804 (MW 2000-7000), RSN0805 (MW 200,000-300,000), RSN0806 (MW 200,000-300,000), RSN0808 (MW 200,000-300,000), RSN0840 (MW 2000-7000), RSN3074 (MW 1000-1500) (also provided by Wacker Chimie AG as SY 231), RSN5314 (alkoxy content 30-40%), RSN6018 (MW 1500-2500) (also known as Dow Corning® Z-6018) and US-CF 2403 (MW<1000) from Dow Corning/Xiameter and other open-chained, cyclic or branched polysiloxanes. Additional preferred alkoxy functional silicon resins that are available from Shin-Etsu Chemical Co of Tokyo, Japan, are KC-89S, KR-500, KR-213, KR-9218, KR-401N, X-40-9227, and KR-510. Other suitable hydroxyl functional silicone resins are MQOH-6 MQ Silanol Resin and MQOH-7 MQ Silanol Resin from Milliken Chemical, Spartanburg, S.C.

While a single or bi fluoroethanol can be used, it is preferred that the alcohol is a trifluoro alcohol. Examples of suitable trifluoro alcohols are 2,2,2-trifluoroethanol, 1,1,1-triflouro-2-propanol and 4,4,4-triflouro-1-butanol. Additionally 3,3,3-trifluoro-1-propanol as well as other propanol and butanol trifluoro isomers can be used. The most preferred alcohol is 2,2,2-trifluoroethanol, which is available from Sigma-Aldrich, St. Louis, Mo., or Halocarbon Products Corporation, Peachtree Corners, Georgia, or WEGO Chemical Group, Great Neck, N.Y. An amount of trifluoroethanol is used so as to provide an equivalents ratio of the trifluoroethanol to the alkoxy functional groups in the polysiloxane resin of from about 1:1 to 3:1, preferably of from about 1.1:1 to about 2:1, and most preferably about 1.2:1. The catalyst may be a titanate or another metal catalyst. The preferred metal catalyst is titanium IV butoxide, 97%, from Sigma-Aldrich of St. Louis, Mo. (also available from Dupont Chemicals, VWR of Radnor, Pa., Alfa Aesar of Ward Hill, Mass., and Fischer Scientific of Hampton, N.H.). Other suitable catalysts include organometallic and metallic catalysts such as dibutyltin dilaurate (which is available from Dura Chemicals Inc., of Emeryville, Calif. or OMG Americas Inc of Franklin, Pa.), other titanates such as tetra isopropyl titanate, cobalts and zirconiums (Sigma Aldrich, VWR, Alfa Aesar, Fischer Scientific) acids and bases such as para-toluenesulfonic acid, phosphoric acid, and sulfuric acid (Ricca Chemical of Arlington, Tex.) and alkali metal hydroxides (Sigma-Aldrich, VWR, Alfa Aesar). The percentage of catalyst added can vary from 0.01% up to 5.00% of the total formula weight. In the preferred embodiment, the alkoxy functional silicon is reacted with the trifluoroethanol in the presence of a catalyst in accordance with the following equation:

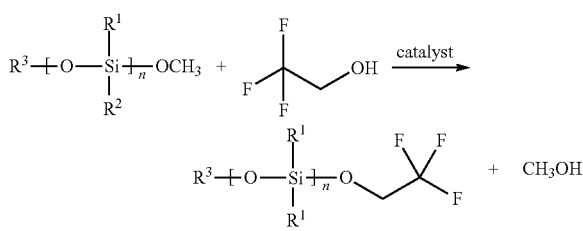

wherein $R^1$, $R^2$ can each be oxygen, or a methyl, phenyl or alkyl group; $R^3$ can be silicon, or a methyl, phenyl or alkyl group; and n is greater than 1. Each $R^1$ and $R^2$ group can be the same or different. The alkyl or alkoxide constituent of the polysiloxane ($R^1$ and $R^2$) may be any constituent which contains from 1 to 10, preferably from 1 to 6, carbon atoms. Suitable alkyl groups include methyl, ethyl, propyl, phenyl and 2-ethylhexyl. The methyl or ethyl esters (alkoxides) of silicon are preferred. The terminal group ($R^3$) may be any constituent that maintains and does not detract from the overall advantages imparted by the fluorinated resin. Therefore, $R^3$ may be silicon, hydrogen, methyl, phenyl or any alkyl group that contains from 1 to 10, preferably from 1 to 6, carbon atoms. The silicon may also have one to three alkyl or alkoxide constituents. The alkyl or alkoxide constituents may be any constituent which contains from 1 to 10, preferably from 1 to 6, carbon atoms. Suitable alkyl groups include methyl, ethyl, propyl, phenyl and 2-ethylhexyl. The methyl or ethyl esters (alkoxides) of silicon are preferred. $R^3$ may also be derived from, but not limited to, the following functional groups: alcohol, thiol, aldehyde, ketone, carboxylic acid, alkyl halide, acrylic, vinyl, aryl, alkyne, epoxy, nitrile, amine, amide, ester, ether, olefin, sulfide, isocyanate, polyurethane (aromatic, aliphatic or combinations thereof), urea, polyaspartic or melamine.

The present disclosure can be further understood by means of the following examples, which are provided to illustrate but not limit the present disclosure. While the example below reflects bench-scale procedures, one of ordinary skill in the art will be able to modify these procedures in order to produce and isolate commercially significant quantities of the present disclosure. Further, additional conventional additives and pigments can also be added to the coating to impart desired characteristics to the final coating.

EXAMPLE 1

In a 2000-ml round-bottom reaction flask equipped with a heating mantle, overhead stirrer, Barrett tube, condenser, and nitrogen purge, 365.9 g (1.95 equivalents of methoxy functionality) of Dow-Corning 3037 Intermediate, which is a methoxy-functional methyl phenyl polysiloxane resin, was mixed with 233.5 g (2.33 moles) of 2,2,2-trifluoroethanol and 1.8 g titanium IV butoxide (0.5% by weight based on the weight of the polysiloxane resin). The contents were heated with stirring under a nitrogen atmosphere to exclude moisture, as both the catalyst and the polysiloxane starting material are air- and moisture-sensitive, and to prevent degradation or gelling of the polysiloxane starting material and product. The temperature of the mixture was gradually raised over a 3 hour period until methanol and trifluoroethanol began to codistill, which occurred at approximately 164° F. The temperature was then slowly raised to keep pace with the production of the distillate until production slowed after 7 hr, 54 min, at a temperature of 215° F. Distillation was then continued with a nitrogen sparge until the production of the distillate had ceased after another 2 hour, 26 min, at a final maximum temperature of 238° F.

Figure 2:
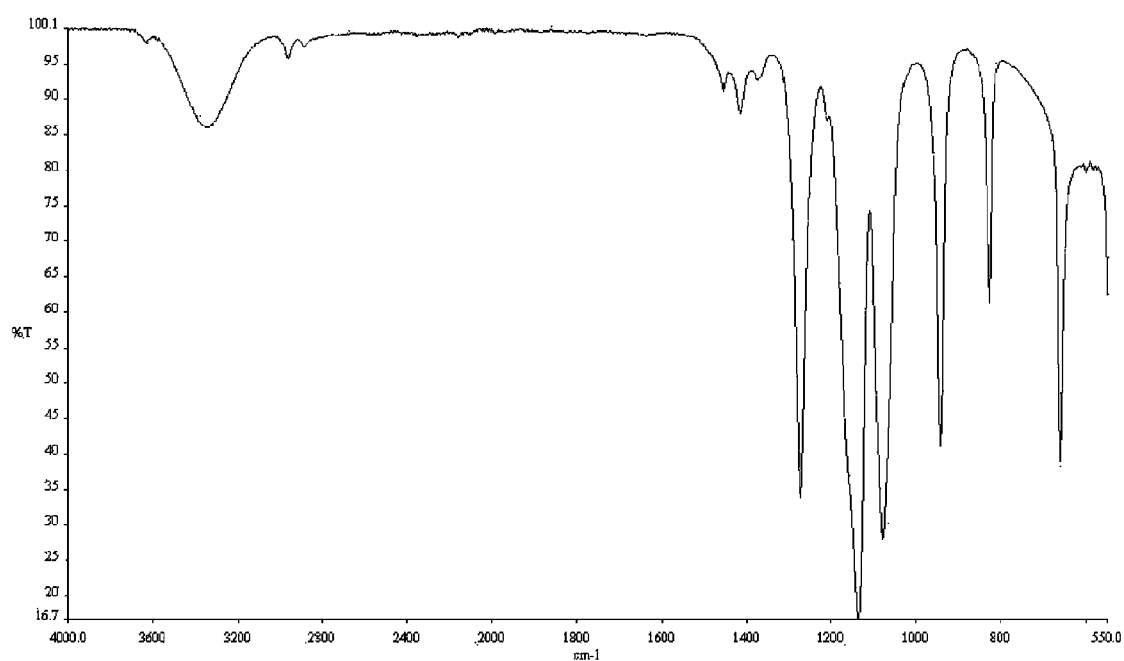
FIG. 2 is a graph of an FTIR analysis of trifluoroethanol showing the percent transmittance on the ordinate axis and the wavelength in cm$^{-1}$ on the abscissa axis.
Figure 3:
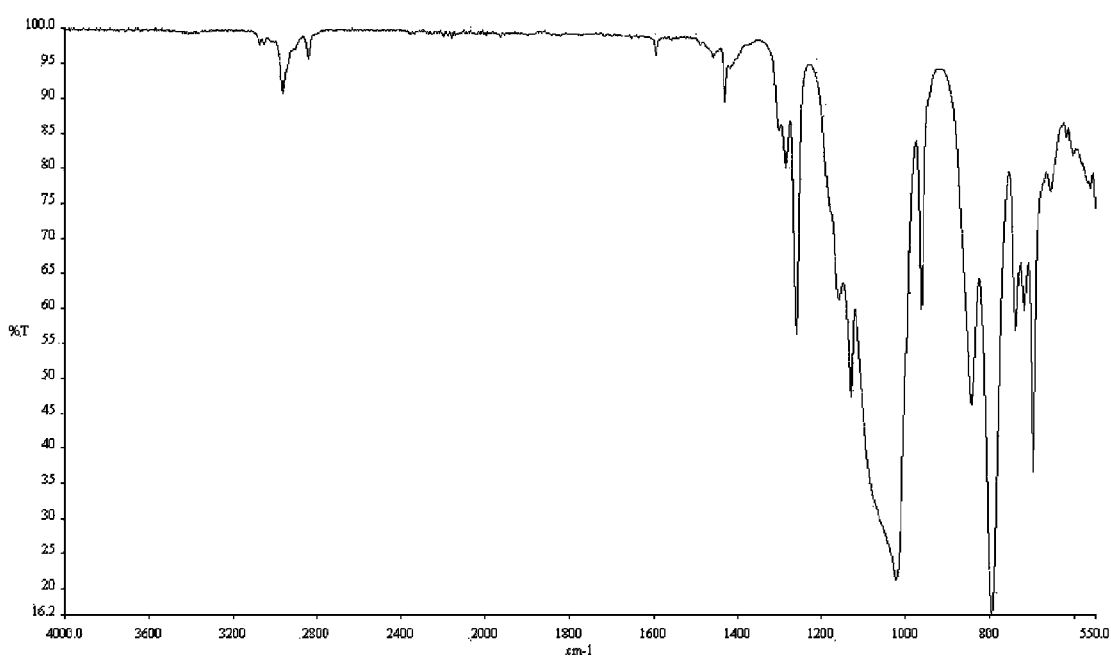
FIG. 3 is a graph of an FTIR analysis of the fluorinated polysiloxane showing the percent transmittance on the ordinate axis and the wavelength in cm$^{-1}$ on the abscissa axis.

The starting Dow-Corning 3037 polysiloxane resin contains an average of 16.5% methoxy groups by weight. In the fluorinated polysiloxane product, approximately 35% of the methoxy groups had been replaced with 2,2,2-trifluoroethanol. The resulting resin contained approximately 16.3% trifluoroethoxy groups by weight and approximately 9.5% methoxy groups by weight. Typical physical test data are shown below in Table 1. The FTIR spectra of Dow-Corning 3037 Intermediate and 2,2,2-trifluoroethanol are shown in FIG. 1 and FIG. 2, respectively. The FTIR spectrum of the resulting fluorinated polysiloxane is shown in FIG. 3. It still shows the peaks seen at approximately 698, 718, 739, 794, 844, 1024, 1130, 1259, 1430, 1594, 2839, 2962, 3051, and 3073 cm$^{-1}$ in the spectrum of the starting resin. The shoulder seen at approximately 1182 cm$^{-1}$ may be assigned to the residual methoxy content of the resin, which gives rise to the peak at 1190 cm$^{-1}$ in the spectrum of the starting resin, overlapped here with peaks corresponding to the broad peaks seen in the 1000-1200 cm$^{-1}$ region of the trifluoroethanol spectrum. New peaks seen at 656, 964, 1160, 1287, and 1302 cm$^{-1}$ appear with the introduction of the trifluoroethoxy groups in the product.

TABLE 1

| Test | Result |
| --- | --- |
| Solids (125° C., 1 hr) | 75.8% |
| Viscosity, Gardner-Holdt | A-4.2 (A-5 + (0.8)) |
| Viscosity, Brookfield (spindle #2, 100 rpm) | 53 cps |
| Wt/gal (lb, 25° C.) | 9.37 |
| Color (Gardner scale) | <1 |
| Appearance | Clear and sparkling |
| Refractive Index (Reichert TS Meter-D, 20° C.) | 1.4427 |
| Solids (ambient temperature in desicator, 7 days) | 92.4% |

EXAMPLE 2

In a 2000-ml round-bottom reaction flask equipped with a heating mantle, overhead stirrer, Barrett tube, condenser, and nitrogen purge, 365.9 g (1.95 equivalents of methoxy functionality) of Dow-Corning 3037 Intermediate, which is a methoxy-functional methyl phenyl polysiloxane resin, is mixed with 332.5 g (3.32 moles) of 2,2,2-trifluoroethanol and 1.8 g titanium IV butoxide (0.5% by weight based on the weight of the polysiloxane resin). The contents are heated with stirring under a nitrogen atmosphere to exclude moisture, as both the catalyst and the polysiloxane starting material are air- and moisture-sensitive, and to prevent degradation or gelling of the polysiloxane starting material and product. The temperature of the mixture is gradually raised until methanol and trifluoroethanol begins to codistill, which will occur at approximately 164° F. The temperature is then slowly raised to keep pace with the production of the distillate until production slows. Distillation is then continued with a nitrogen sparge until the production of the distillate is ceased.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure.

Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations, which is not specifically disclosed herein.

The invention claimed is:

1. A method of producing a fluorinated polysiloxane comprising:
   providing an alkoxy-functional silicone resin;
   adding a fluorinated alcohol to the silicone resin to form a mixture;
   adding a catalyst to the mixture; and
   reacting the silicone resin and fluorinated alcohol in the presence of the catalyst to form a fluorinated polysiloxane,
   wherein the alkoxy-functional silicone resin has the following structure:

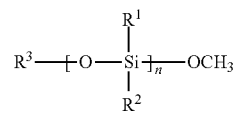

wherein each R$^1$ and R$^2$ are independently selected from the group consisting of an alkyl group, a phenyl group, and an alkoxide group; R$^3$ is selected from the group consisting of an alkyl group and a phenyl group, and n is greater than 1.

2. The method of claim 1, wherein the fluorinated polysiloxane contains some residual non-fluorinated alkoxy functionality and the ratio of fluorinated alcohol to alkoxy functional group in the resin is about 1:1 to 3:1.

3. The method of claim 1, wherein the mixture is substantially free of solvents.

4. The method of claim 1, wherein the alcohol is a trifluorinated alcohol.

5. The method of claim 1, wherein the alcohol is 2,2,2-trifluorinated alcohol.

6. The method of claim 1, wherein the catalyst is a titanate and is added to the mixture in an amount from about 0.01% to about 5% by weight of the total formula weight of said mixture.

7. The method of claim 1, wherein the fluorinated polysiloxane contains some residual non-fluorinated alkoxy functionality.

8. The method of claim 7 where the ratio of fluorinated alcohol to alkoxy functional group in the resin is about 1.2:1.

9. The method of claim 8, wherein the fluorinated alcohol is a trifluorinated alcohol.

10. The method of claim 7, wherein: the at least one silicone resin comprises an alkoxy-functional silicone resin; and the fluorinated alcohol is a trifluorinated alcohol.

11. The method of claim 1, wherein the reacting step includes the addition of heat to the mixture.

12. A coating prepared by crosslinking the fluorinated polysiloxane made by the method of claim 1.

13. A method of producing a fluorinated polysiloxane comprising:
providing at least one silicone resin selected from the group consisting of hydroxyl-functional silicone resins, alkoxy-functional silicone resins and mixtures thereof;
adding a fluorinated alcohol to the silicone resin to form a mixture;
adding a catalyst to the mixture; and
reacting the silicone resin and fluorinated alcohol in the presence of the catalyst to form a fluorinated polysiloxane,
wherein the fluorinated polysiloxane retains some hydroxyl or alkoxy functionality, and
wherein the ratio of fluorinated alcohol to alkoxy or hydroxyl functionality is about 1:1 to about 3:1.

14. The method of claim 13, wherein the ratio of fluorinated alcohol to alkoxy or hydroxyl functionality is about 1.2:1.

15. The method of claim 13, wherein the mixture is substantially free of solvents.

16. The method of claim 13, wherein the alcohol is a trifluorinated alcohol.

17. The method of claim 13, wherein the alcohol is 2,2,2-trifluorinated alcohol.

18. The method of claim 13, wherein the catalyst is a titanate and is added to the mixture in an amount from about 0.01% to about 5% by weight of the total formula weight of said mixture.

19. The method of claim 13, wherein the at least one silicone resin comprises an alkoxy functional silicone resin.

20. The method of claim 19, wherein the at least one silicone resin comprises an alkoxy functional silicone resin having the following structure:

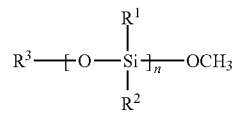

wherein each $R^1$ and $R^2$ are independently selected from the group consisting of a methyl group, a phenyl group, an alkoxide group and an alkyl group, $R^3$ is selected from the group consisting of a methyl group, a phenyl group and an alkyl group, and n is greater than 1.

21. The method of claim 13, wherein the fluorinated alcohol is a trifluorinated alcohol.

22. The method of claim 13, wherein:
the at least one silicone resin comprises a alkoxy-functional silicone resin; and the fluorinated alcohol is a trifluorinated alcohol.

23. The method of claim 13, wherein the reacting step includes the addition of heat to the mixture.

24. The method of claim 13, wherein the fluorinated polysiloxane retains some hydroxyl or alkoxy functionality.

* * * * *